US007621640B2

(12) United States Patent

Lloyd

(10) Patent No.: US 7,621,640 B2

(45) Date of Patent: Nov. 24, 2009

(54) OPTICAL DEVICE FOR PRODUCING A VIRTUAL IMAGE

(76) Inventor: Beverly Lloyd, 8 Cove Rd., Lake Hopatcong, NJ (US) 07849

( * ) Notice: Subject to any disclaimer, the term of this patent is extended or adjusted under 35 U.S.C. 154(b) by 688 days.

(21) Appl. No.: 11/355,807

(22) Filed: Feb. 17, 2006

(65) Prior Publication Data

US 2007/0195056 A1 Aug. 23, 2007

(51) Int. Cl.
*G03B 21/00* (2006.01)
*F21V 3/00* (2006.01)

(52) U.S. Cl. .................................... 353/10; 362/311.03

(58) Field of Classification Search ................... 353/10, 353/28, 62, 74, 97; 359/478, 479, 300, 579, 359/311.03; 362/29, 186, 223, 255, 311, 362/317, 351, 355; 352/43, 49, 85, 86
See application file for complete search history.

(56) References Cited

U.S. PATENT DOCUMENTS

| | | | | |
|---|---|---|---|---|
| 3,293,983 A | | 12/1966 | Gaudyn | |
| 3,298,277 A | * | 1/1967 | Scharf | 353/56 |
| 3,666,936 A | * | 5/1972 | Webster et al. | 40/444 |
| 3,868,501 A | | 2/1975 | Barbour | |
| 4,261,657 A | * | 4/1981 | Reiback | 353/10 |
| 4,571,041 A | | 2/1986 | Gaudyn | |
| 4,858,079 A | * | 8/1989 | Ohashi | 362/35 |
| 5,257,130 A | | 10/1993 | Monroe | |
| 5,782,547 A | * | 7/1998 | Machtig et al. | 353/28 |
| 5,787,618 A | * | 8/1998 | Mullis | 40/219 |
| 5,803,564 A | * | 9/1998 | Bruinsma et al. | 353/10 |
| 5,993,005 A | * | 11/1999 | Geranio | 353/10 |
| 6,012,815 A | * | 1/2000 | Bruinsma et al. | 353/10 |
| 6,055,100 A | * | 4/2000 | Kirk | 359/457 |
| 6,135,599 A | * | 10/2000 | Fang | 353/98 |
| 6,296,375 B1 | * | 10/2001 | Sung et al. | 362/255 |
| 6,364,490 B1 | * | 4/2002 | Krause | 353/77 |
| 6,375,324 B2 | | 4/2002 | Schleger | |
| 6,375,326 B2 | * | 4/2002 | Myers | 353/10 |
| 6,497,484 B1 | * | 12/2002 | Hoerner et al. | 353/10 |
| 6,594,083 B1 | | 7/2003 | Raber | |
| 6,612,725 B2 | * | 9/2003 | Camarota et al. | 362/372 |
| 6,809,891 B1 | * | 10/2004 | Kerr et al. | 359/797 |
| 7,229,176 B2 | * | 6/2007 | Onaga | 353/10 |
| 2002/0012105 A1 | | 1/2002 | Meyers | |
| 2002/0126396 A1 | | 9/2002 | Dolgoff | |
| 2005/0195368 A1 | * | 9/2005 | Bissinger | 353/10 |
| 2006/0291051 A1 | * | 12/2006 | Kim et al. | 359/462 |
| 2007/0229952 A1 | * | 10/2007 | Takayoshi | 359/478 |
| 2007/0297073 A1 | * | 12/2007 | Braithwaite et al. | 359/742 |

* cited by examiner

*Primary Examiner*—Diane I Lee
*Assistant Examiner*—Danell L Owens
(74) *Attorney, Agent, or Firm*—Thomas L. Adams

(57) ABSTRACT

An optical device can produce a virtual image visible from a vantage point. The device has one or more lenses, a source for producing light, and an internally illuminable, non-transparent display object. The source can produce light in the display object in order to internally illuminate the display object and cause it to predominantly radiate internal light. The lens(es) can project a virtual image of the display object. In some instances two or more devices with matching display objects may be used to project one virtual image of the display objects. Each device is angled in order to increase the field of view of the virtual image.

22 Claims, 4 Drawing Sheets

OPTICAL DEVICE FOR PRODUCING A VIRTUAL IMAGE

BACKGROUND OF THE INVENTION

1. Field of the Invention

The present invention relates to optical devices for providing decorative or entertaining visual effects, and in particular, to optical devices for projecting virtual images.

2. Description of Related Art

It is well known to produce in front of a lens a virtual image of a three dimensional object behind the lens. For example, in FIG. 2 of U.S. Pat. No. 5,257,130 light shining on an object 12 is reflected and transmitted through a double convex lens 27 to produce a virtual image 16 in front of a scrim 44. See also U.S. Pat. No. 6,594,083. Such virtual images have also been created with Fresnel lenses. In some cases a three dimensional object is rotated so that the virtual image rotates as well. See U.S. Pat. No. 4,261,657.

The foregoing arrangements rely on an external light shining on the surface of the object. The inventor has discovered that inappropriate external lighting of an object is a source of undesirable optical effects. In particular, a three dimensional object reflecting light from an external light source will project a virtual image that is surrounded by an aura. In general, a projected virtual image was found to be highly sensitive to the type of illumination and care must be taken to avoid the aura effect or other undesirable visual effects.

In FIGS. 1-3 of U.S. Pat. No. 3,293,983 an external light again shines on object 30 so that an aura will be created around virtual image 39. For the embodiment of FIG. 4 the display object 45 and its support 44 are both transparent (and presumably illuminated as before). Regardless of any aura effect, transparent display objects with transparent supports are undesirable because the support has the same visual prominence as the display object. Also, transparent objects tend to produce ghost-like images and often transmit "hot spots" originating from the background or from the illumination source. Hot spots can be especially problematical when an object is backlit as in FIG. 5.

In U.S. Pat. No. 3,868,501 hot spots will be extremely distracting in that a large lightbulb 41 is placed behind a transparent panel 43 that is imprinted with a design 42. The resulting virtual image in front of Fresnel lens 41 is shown as a lightbulb bearing the image of transparent panel 43.

In U.S. Pat. No. 6,375,326 and U.S. Patent Application Publication No. 2002/0012105 an image from source 10 may be transmitted through beam splitter 13 and Fresnel lens 11 before being reflected by mirror 12 and sent back again through Fresnel lens 11; finally being reflected outwardly by beam splitter 13. This reference does not describe how illumination is handled in image source 10.

In FIG. 11 of U.S. Pat. No. 4,571,041 reflected light from an externally illuminated object 116 is transmitted through lens 120, reflected by reflector 126 and then transmitted through lens 118 to produce a virtual image 130 in front of the lenses.

See also U.S. Patent Application Publication No. 2002/0126396.

Materials have been categorized as transparent, translucent, or opaque. Opaque materials transmit essentially no light, while transparent materials transmit a high percentage of incident light while maintaining image clarity; i.e., one can clearly see objects on the opposite side of transparent materials. Translucent material will transmit light but will not maintain image clarity, so someone cannot easily see objects on the opposite side of translucent material. A great number of physical phenomena can cause image degradation in a translucent material. Scattering or diffusion of light can be caused by interaction of light with the translucent material at an atomic or molecular level. Also, macroscopic, microscopic, or colloidal particles in a translucent material can also diffuse light. For situations where light diffusion occurs throughout a volume through which light travels, the diffusion of the light can be characterized by a scattering coefficient. On the other hand, some materials may have a roughened surface (e.g., etched glass or roughened plastic) that diffuses light through a complex combination of refraction, reflection, interference, etc. and is not easily characterized by a scattering coefficient.

Fundamentally, light transmitted through translucent material is mostly non-specular, meaning the emerging light is spread over an angular distribution, even when the incident radiation is a coherent or collimated beam arriving at a discrete angle. Nevertheless, some translucent materials will have both specular and diffuse transmission. In such cases the transmitted light has been characterized by a haze parameter defined as the ratio between the diffuse part of the transmitted light to the total transmitted light. Instruments for measuring the haze parameter are offered by Byk-Gardner of Geretsried, Germany.

Ideal light diffusion will have a Lambertian distribution, in which the light intensity varies with emission angle as a cosine function. Since the effective area of a Lambertian source also decreases as a cosine function of the emission angle in the same proportion as the intensity, the brightness of the Lambertian surface is constant for all emission angles (i.e., uniform brightness for a solid angle of substantially $2\pi$ steradians). Opal glass is an example of a Lambertian diffuser, but one with low efficiency. Not all translucent material will diffuse light with a Lambertian distribution and in some cases the non-specular light will have a Gaussian distribution, or some other angular distribution.

SUMMARY OF THE INVENTION

In accordance with the illustrative embodiments demonstrating features and advantages of the present invention, there is provided an optical device for producing a virtual image visible from a vantage point. The optical device includes an internally illuminable, non-transparent display object. Also included is a source for producing light in the display object to internally illuminate the display object and cause the display object to predominantly radiate internal light. The optical device includes one or more lenses for projecting a virtual image of the display object.

In accordance with another aspect of the invention, an optical device can produce a virtual image that is visible from a vantage point. The optical device includes a plurality of internally illuminated, matching display objects for predominantly radiating internal light. The optical device also includes a plurality of lenses each associated with a corresponding one of the display objects for projecting a virtual image of a corresponding one of the display objects. The virtual images of the lenses being coincident in order to increase the viewable angles of the image produced by the matching display objects.

With the latter arrangement, two or more devices with matching display objects may be used to project one virtual image of the display objects. Each device is angled in order to increase the field of view of the virtual image.

Apparatus of the foregoing type achieves an improved optical device for producing virtual images. In an exemplary constructed embodiment a box has a front window opening fitted with one or more Fresnel lenses. Inside the box a hollow sphere is mounted on a spindle driven by an electric motor. The pole of this sphere opposite the spindle has an opening fitted with a bearing to hold a non-rotating light for internally illuminating the sphere. The lens(es) and the illuminated hollow sphere are arranged to produce a virtual image in front of the lens(es), outside the box. Other embodiments are contemplated with external light sources for internally illuminating the display object.

This sphere is translucent and will radiate internal light to avoid creating a virtual image with a distracting aura. Also, the translucent material will diffuse light to avoid hot spots.

Optical devices of the foregoing type can be operated with two or more devices, each with identical display objects that produce coinciding virtual images in order to enhance the field of view of the virtual image.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
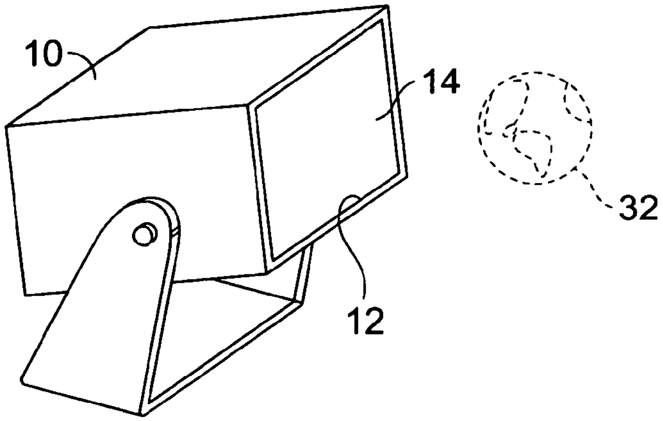
FIG. 1 is perspective view of an optical device in accordance with principles of the present invention.
Figure 2:
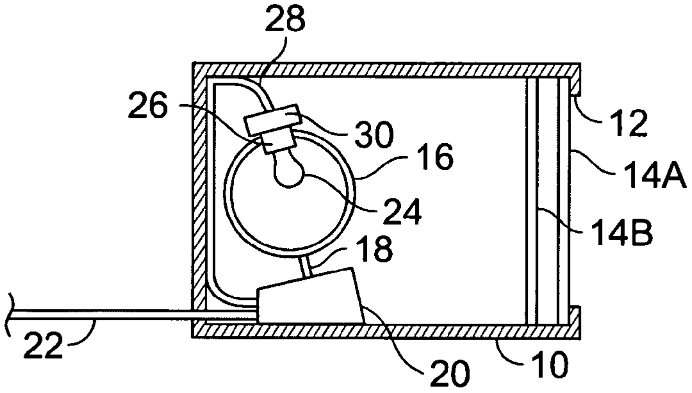
FIG. 2 is a side elevational view, partly in section, of the optical device of FIG. 1.

Referring to FIGS. 1 and 2 an optical device is shown employing a box 10, which is about 18 inches (46 centimeters) long, although boxes of different sizes are contemplated, depending upon the available space, the size of the desired virtual image, etc. While a rectangular box is illustrated, other embodiments may employ boxes with shapes that are, at least in part, cylindrical, spherical, ovoid, polyhedral, etc. The inside of box 10 is coated with a light absorbing material such as a flat black paint.

The front of box 10 has a window opening 12 fitted with two Fresnel lenses 14A and 14B, although other embodiments may employ fewer or more Fresnel lenses, a traditional lens with lenticular surfaces, or other types of lenses. Lenses 14A and 14B may be attached to the back of a ridge provided on window opening 12. The focal length of lenses 14A and 14B will be selected to produce the desired virtual image to be described presently. The height, width, and spacing between lenses 14A and 14B will be selected to produce a virtual image of the desired size and with a desired viewing angle. In this embodiment lenses 14A and 14B have an outline that is a 12 inch (30 cm) square, although other outlines having other dimensions are contemplated for other embodiments.

Display object 16 inside box 10 is an internally illuminable hollow sphere, and in one constructed embodiment, was a plastic globe imprinted with Earth's geographical details. It will be understood that other display objects are contemplated having a variety of shapes and sizes. Globe 16 is mounted on a tilted spindle 18, which is rotated by electric motor 20 (also referred to as a motor mechanism) powered in turn by electrical line 22. It will be understood that the globe need not be tilted, rotating, or moving. Movement of the display object does, however, enhance the look of the resulting virtual image.

A source for producing light is mounted in an opening at the upper pole of globe 16 opposite spindle 18. In particular the source includes a light source 24 in the form of an incandescent bulb projecting into the hollow region of globe 16. Light source 24 is mounted in fixture 26, which is attached through bearing 30 to globe 16. Some embodiments will use alternate light sources such as fluorescent lights, discharge lamps, LEDs, electroluminescent sources, etc. Power is supplied to the electrodes of fixture 26 by power line 28, which is routed from the package containing motor 20. Power can also be supplied by other means, such as a battery.

In some embodiments line 28 is connected in parallel to line 22. In other embodiments a switch (not shown) may be incorporated into the package containing motor 20 to allow a user to power motor 20 and light source 24 either together or independently. In still other embodiments a line switch (not shown) may be placed in power line 22.

To facilitate an understanding of the principles associated with the foregoing apparatus, its operation will be briefly described. When power is supplied through line 22, motor 20 rotates globe 16 while light source 24 remains stationary. Basically, the outer race of bearing 30 rotates with globe 16 while the inner race remains stationary and supports light fixture 26. Other lighting that rotates with the globe, like battery-operated LED's, may also be employed.

Being internally illuminated by light source 24, globe 16 provides a distinct image that allows Fresnel lens 14 to project a rotating virtual image 32 outside box 10. In one embodiment globe 16 was positioned and the focal length of Fresnel lens 14 was selected to place virtual image 32 about 12 inches (30 cm) in front of lens 14, although other spatial placements are contemplated. Since essentially all of the light from globe 16 is derived from internal illumination and not reflection, no aura exists around virtual image 32.

While internally illuminating globe 16 avoids an aura, care must be taken to avoid hot spots. For that reason, the material of globe 16 is made translucent in order to diffuse light from source 24. In general, the quality of light diffusion depends both on the proportion of diffuse transmission (i.e., haze parameter) and the angular divergence of the light caused by the diffusion. For adequate diffusion and avoidance of prominent hot spots a haze parameter of at least 15% is adequate for the material of globe 16, while a haze parameter of at least 75% will be more effective.

Defining an adequate angular divergence for the diffuse light must be somewhat arbitrary since typically the light intensity from the translucent material fades but does not vanish at large angles of divergence. In this specification an angular offset causing an 80% decrease in diffuse light intensity from its peak intensity will be defined as the measure of angular divergence. As an example, for the cosine distribution function of a Lambertian diffuser, diffuse light intensity will be 20% of the peak intensity at an angle of ±78° from its peak and therefore the Lambertian diffuser will be deemed to have an angular divergence of ±78°. A Lambertian diffuser will have more than adequate angular divergence, but will be infrequently employed for practical reasons.

For present purposes, if the angular divergence of diffuse light from display object 16 is at least ±15° (0.2 steradians) from its peak (i.e., 20% of the peak at ±15°), adequate diffusive angular divergence and avoidance of hot spots will be achieved. In fact, more effective diffusion and avoidance of hot spots will be achieved if the angular divergence is selected to be at least ±30°.

While in the above embodiment light diffusion occurs by virtue of the characteristics of the display object, in other embodiments the diffusion may occur at the light source. For example, some embodiments may employ a relatively large lightbulb that is frosted, crazed, or otherwise treated to diffuse the light transmitted through the bulb. In such cases, the display object may provide very little or no diffusion.

Figure 3:
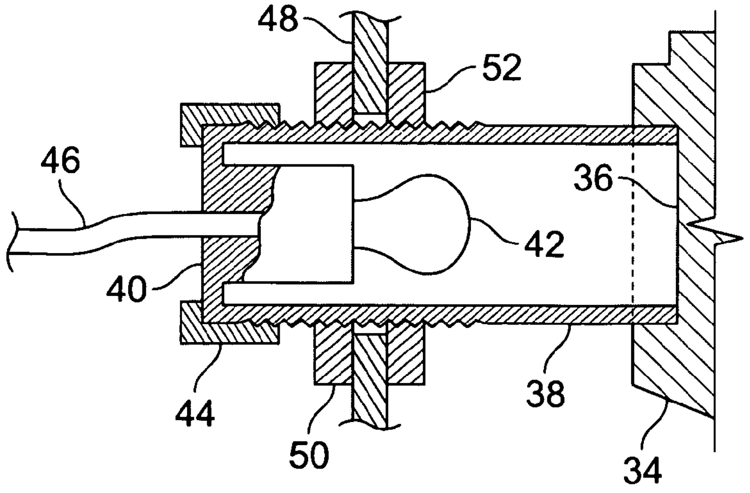
FIG. 3 is a sectional view of a fragment of an optical device that is an alternate to that of FIG. 1.

Referring to FIG. 3, an alternate display object 34 is illustrated having some arbitrary shape. In this embodiment, object 34 is not hollow and has instead a light opening in the form of a cylindrical depression 36 for receiving the proximal open end of tubular chamber 38. Chamber 38 may be secured in depression 36 by a force fit, glue, or by other means such as threads. Alternatively, the open end of chamber 38 may have in some embodiments a flange or other mounting surface that attaches to the outside of the display object, in which case the display object need not necessarily have a depression and may simply offer a surface onto which the flange is secured by screws or other means. In still other embodiments, the chamber 38 may be integrally molded with the display object.

Mounted in the distal end of chamber 38 is a light source comprising a fixture 40 holding an incandescent light bulb 42. Fixture 40 is held on the distal end of chamber 38 by threaded collar 44 whose internal threads engage the external threads at the distal end of chamber 38. Power is supplied to the electrodes of light bulb 42 by power line 46.

Chamber 38 is mounted in a hole in the rear wall 48 of a box similar to the previously mentioned box (box 10 of FIG. 2). Chamber 38 is secured to wall 48 by outside nut 50 and inside nut 52, which are threaded around chamber 38. In this embodiment display object 34 is supported by chamber 38, although other embodiments may have an independent support for object 34. While object 34 and chamber 38 are stationary in this embodiment, for other embodiments means may be provided to rotate object 34 either about chamber 38 or together with chamber 38. Alternatively, object 34 may translate along a closed path with or without rotating.

Figure 4:
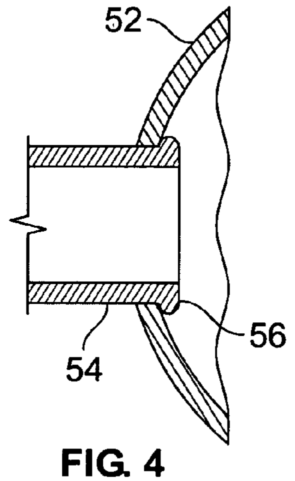
FIG. 4 is a sectional, fragmentary view of the joint between a display object and light source that is an alternate to that of FIG. 3.

Referring to FIG. 4, the previously mentioned chamber (chamber 38 of FIG. 3) is replaced with an alternate tubular chamber 54, which has been modified to include a bead 56 at its open end. Bead 56 is designed so that the open end of chamber 54 snaps into a mating hole in hollow cylindrical display object 52.

Figure 5:
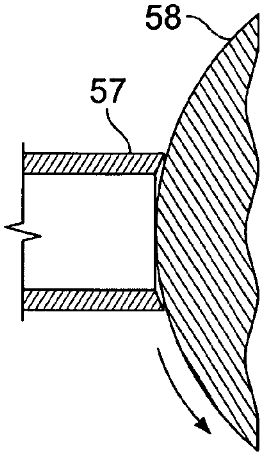
FIG. 5 is a sectional, fragmentary view of the joint between a display object and light source that is an alternate to that of FIGS. 3 and 4.

Referring to FIG. 5, the previously mentioned chamber (chamber 54 of FIG. 4) is replaced with an alternate tubular chamber 57, which has been beveled at its open end to closely follow the spherical surface of display object 58. Any gap between tubular chamber 57 and display object 58 is kept small so that a high percentage of the light reaching the open end of chamber 57 is transmitted into object 58 with very little light escaping both chamber 56 and object 58, so that object 58 is efficiently illuminated internally. Object 58 is a solid translucent sphere that rotates about a central axis.

Figure 6:
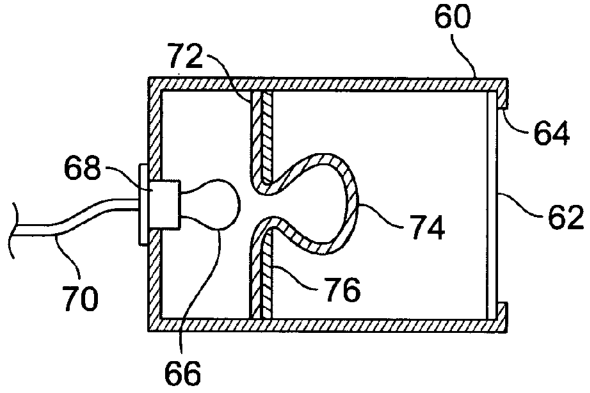
FIG. 6 is a cross-sectional view of an optical device that is an alternate to that of FIGS. 1-5.

Referring to FIG. 6, a box 60 similar to box 10 of FIG. 1 has a Fresnel lens 62 mounted in the window opening 64. A light source 66 is mounted in a fixture 68, which is mounted in a hole in the back of box 60. Power may be supplied to the light source 66 by power line 70 or other means.

A partition 72 mounted in front of lens 66 has an integral hollow blister 74. Partition 72 is opaque except for blister 74 which is made of translucent material. Blister 74 is accessible from behind to admit light from the light source 66. Accordingly, blister 74 acts as an internally-lit display object whose virtual image is projected by Fresnel lens in front of the lens.

Figure 7:
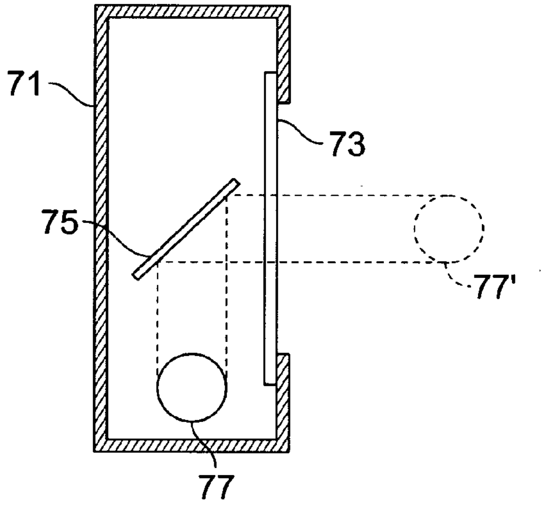
FIG. 7 is a cross-sectional view of an optical device that is an alternate to that of FIGS. 1-6.

Referring to FIG. 7, a box 71 with a front window opening is fitted with a Fresnel lens 73. Display object 77 is in this embodiment a hollow translucent plastic sphere containing a battery-powered blinking LED (not shown). Mirror 75 is oriented at an angle to lens 73 to provide a reflected image of object 77 to lens 73, which in turn produces a virtual image 77'. The addition of mirror 75 has the advantage of creating a display unit that is more shallow from the front of the unit where the lens is, to the back of the unit. A shallower unit may be more desirable as it is less cumbersome as a wall-mounted device, for example.

Figure 8:
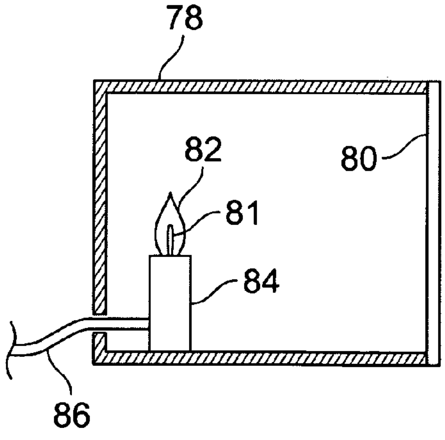
FIG. 8 is a cross-sectional view of an optical device that is an alternate to that of FIGS. 1-7.

Referring to FIG. 8, a box 78 similar to the previously mentioned box (box 60 of FIG. 6) has an open front that is fitted with a Fresnel lens 80. In this embodiment light is provided by a wavering incandescent filament 81 inside glass bulb 82. Lamps of this type are commonly available commercially and are designed to simulate a flickering candle flame. This lamp is mounted in fixture 84 and is powered by power line 86. An image of this wavering filament 81 is projected by lens 80 to form a virtual image. Accordingly, filament 81 is herein referred to as a display object. Since electric current flowing through filament 81 causes it to glow incandescently, filament 81 is considered to be an internally illuminable display object. The source for generating the incandescent light is considered herein the electric current provided by power line 86. In some embodiments the wavering incandescent filament can be replaced with an OLED (organic light emitting diode).

Figure 9:
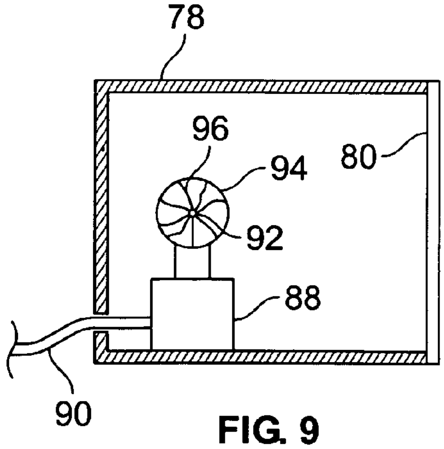
FIG. 9 is a cross-sectional view of an optical device that is an alternate to that of FIGS. 1-8.

Referring to FIG. 9, the contents of previously mentioned box 78 (which is fitted with Fresnel lens 80) has been replaced with a discharge device, commonly referred to as a plasma ball. This device has a high-voltage generator 88 powered by line 90 to produce a high-voltage on electrode 92 relative to a grounded conductive coating on the inside surface of transparent globe 94. This high-voltage causes an electrical discharge that forms a plurality of streamers 96 of glowing gas.

Essentially, electrons flowing in the discharge stream temporarily drive the atoms in the gas in globe 94 into a higher energy state where they can emit a photon before returning to a lower energy state. In this embodiment lens 80 produces a virtual image of the streamers 96 of glowing gas and so streamers 96 are herein referred to as a display object that is internally illuminated. The energy source for producing the light is considered the high-voltage electrode 92.

Figure 10:
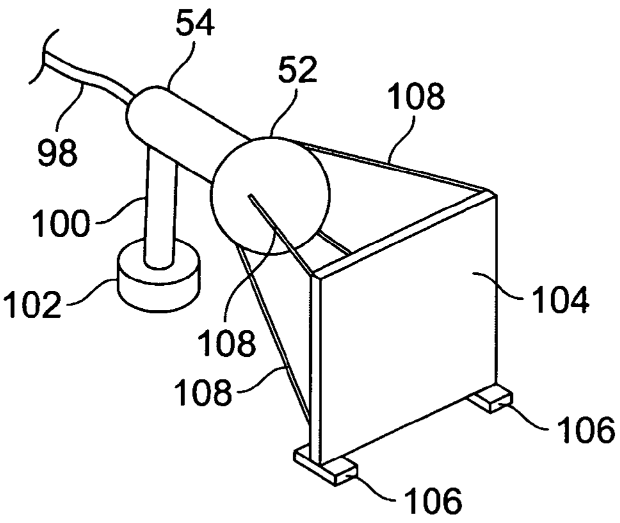
FIG. 10 is a perspective view of an optical device that is an alternate to that of FIGS. 1-9.

Referring to FIG. 10, previously mentioned chamber 54 (containing a light source powered by line 98) is attached to hollow sphere 52 in the manner illustrated in FIG. 4. In this embodiment, display object 52 and the light source (in chamber 54) are not contained inside a box. Instead, chamber 54 is supported on a stand 100 on a base 102. A Fresnel lens 104 is mounted on a pair of feet 106. Four optional struts 108 attach between the corners of lens 104 and the periphery of display object 52. The foregoing embodiment is designed to be placed on a table or shelf. Alternatively, items 52 and 54 can be mounted inside a wall behind an opening in the wall that is covered by lens 104.

Figure 11:
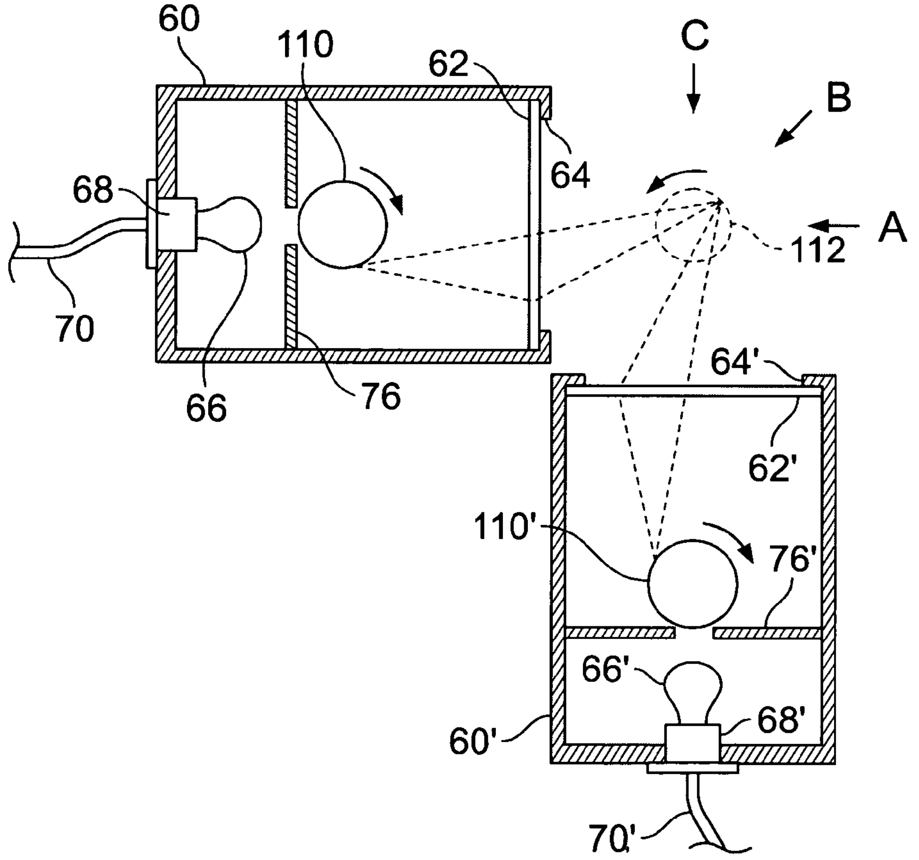
FIG. 11 is a cross-sectional view of another embodiment employing a pair of optical devices for producing coincident virtual images.

Referring to FIG. 11, box 60 and light source 66, 68, 70 are identical to the corresponding components shown in FIG. 6. Partition 76 is as before and has an aperture for transmitting light into display object 110. Display object 110 is a solid sphere of translucent material mounted on a rotating spindle in a manner similar to that shown in FIG. 2. The display object 110 is kept fairly close to the aperture in partition 76 so that essentially all the light passing through partition 76 is transmitted into display object 110 to internally illuminate it.

Also shown in FIG. 11 is a complementary device essentially the same as the one just described. Accordingly, corresponding components are shown with identical reference numerals, but marked with a prime ('). Accordingly, the devices have a matching pair of display objects 110 and 110' and a pair of lenses 62 and 62'. Boxes 60 and 60' are displaced 90° with the right front corner of box 60 adjacent to the left front corner of box 60'.

Display objects 110 and 110' are rotated synchronously but with a different phase. Specifically, the phase of display object 110 is advanced 90° relative to display object 110'. Positioned and phased in this manner, virtual image 112 is composed of two coincident virtual images projected by lenses 62 and 62'. From vantage point A virtual image 112 is created essentially only by lens 62, while from vantage point C virtual image 112 is created essentially only by lens 62'. From vantage point B, virtual image 112 is created jointly by lenses 62 and 62'. Consequently, virtual image 112 is visible over a relatively wide field of view.

While the foregoing employed two boxes 60 and 60' arranged at right angles, other embodiments may employ three boxes arranged along orthogonal axes. In addition, other embodiments may employ two or more boxes with angles other than 90 degrees. The boxes are angled such that the virtual images land in the same location. With devices where the virtual image lands farther in front of the lenses, the angles will need to be less than 90 degrees. For devices where the virtual image lands closer to the lenses, the angles will need to be greater than 90 degrees. Thus, multiple devices requiring angles of less than 90 degrees will end up arranged such that their foremost lenses form the shape of a section of a sphere. This is needed for all of their virtual images to land in the same spot so to appear as one virtual image of a single display object.

Figure 12:
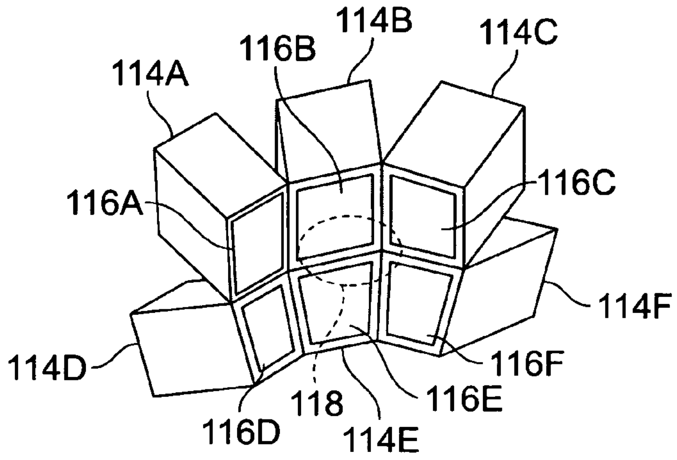
FIG. 12 is a perspective view of another embodiment employing a plurality of optical devices for producing coincident virtual images.

Referring to FIG. 12, six boxes 114A-114B having lenses 116A-116B are each constructed in a manner similar to that box 60 of FIG. 11. Boxes 114A-114B are shown in a spherical arrangement, that is, with the principal axes of their lenses 116A-116B converging at a common point. It will be appreciated that if the lenses 116A-116B are contiguous, they cannot all be square or rectangular, but may instead take the shape of the polygonal element of any one of the well-known geodesic domes. Alternatively, the lenses 116A-116B may be spaced somewhat in order to maintain a square or rectangular outline. In any event, when arranged in this fashion, boxes 114A-114B can produce a virtual image 118 that is composed of six coincident virtual images projected by each of the lenses 116A-116B.

Figure 13:
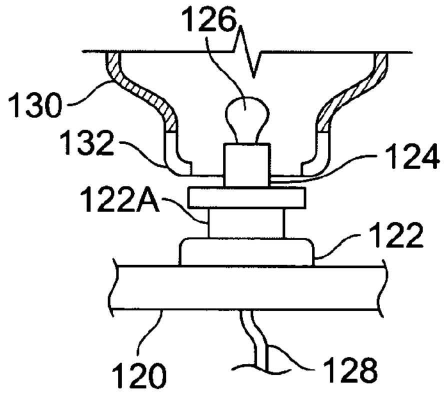
FIG. 13 is a sectional, fragmentary view of the joint between a display object and light source that is an alternate to those above.

The device may be constructed so that the display object is interchangeable. In this way a person may, for example, remove a display object of a Halloween pumpkin and replace it with a Santa, or a globe of the earth, or a plasma ball, etc. One way to do this is seen in FIG. 13, where wall 120 is part of a box that is similar to that shown in FIG. 2. An internally mounted collar 122 with an annular groove 122A support lamp socket 124 shown holding a lightbulb 126. Power is supplied to lamp socket 124 by power cord 128. An alternative display object 130 is shown as a hollow arrangement with a lower neck formed into a number of fingers 132, which may be snapped into annular groove 122A. Accordingly, display object 130 can be quickly removed and replaced with a different display object. Thus, the display object can be changed to something consistent with a seasonal theme, a holiday symbol, or some other personal choice of the user. It will be understood that there are other ways to make connections to allow the display objects to be interchangeable.

Figure 14:
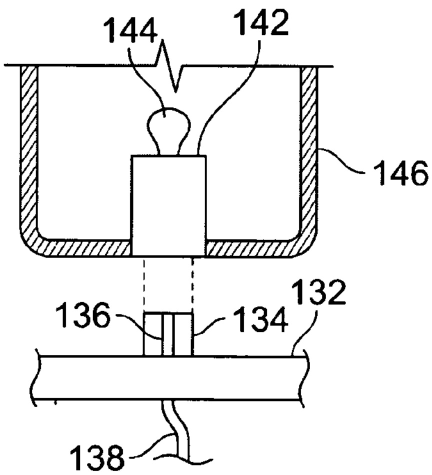
FIG. 14 is a sectional, fragmentary view of the joint between a display object and light source that is an alternate to those above.

Referring to FIG. 14, wall 132 is part of box that is similar to that shown in FIG. 13. An internally mounted plug 134 has a number of electrical contacts 136 that are powered by cord 138. Plug 134 is designed to fit into a socket (not shown) on the underside of lamp base 142, which is shown holding lightbulb 144. Accordingly, power from cord 138 can be supplied through plug 134 and base 142 to lightbulb 144. Lamp base 142 is shown attached in an opening on the bottom of display object 146. As before, the display object 146 can be replaced with another object to satisfy the user's preferences.

It is appreciated that various modifications may be implemented with respect to the above described, preferred embodiments. Sources for generating light of various types may be employed including laser light, ultraviolet light, monochromatic light, etc. In addition, the size and shape of the components can be varied depending on the desired image size, available space, aesthetic considerations, etc. In some embodiments, the single device may be replaced with a spaced plurality of devices to produce multiple identical images. The display object need not be solid and in some embodiments may be a liquid or gaseous medium that is either contained or free-flowing. In addition, these mediums may have particles designed to scatter, disperse, or diffuse light. Moreover, the light may be generated by a non-visible electromagnetic radiation that stimulates another medium that in turn produces visible light. Moreover, the display object may be supported in various manners including levitation by an airstream or electromagnetic field, or motion produced through launching, bouncing, etc. Furthermore, an image of the display object can be produced through various types of mirrors including curved mirrors designed to alter the image size or to distort the image.

Obviously, many modifications and variations of the present invention are possible in light of the above teachings. It is therefore to be understood that within the scope of the appended claims, the invention may be practiced otherwise than as specifically described.

The invention claimed is:

1. An optical device for producing a virtual image visible from a vantage point, comprising:

an internally illuminable, non-transparent, translucent display object, said display object comprising material having a haze parameter of at least 15%;

a source for producing light in said display object to internally illuminate said display object and cause said display object to predominantly radiate internal light; and one or more lenses for projecting a virtual image of said display object.

2. An optical device for producing a virtual image visible from a vantage point, comprising:

an internally illuminable, non-transparent, hollow display object;

a mechanism for moving said display object;

a source for producing light in said display object to internally illuminate said display object and cause said display object to predominantly radiate internal light; and one or more lenses for projecting a virtual image of said display object.

3. An optical device for producing a virtual image visible from a vantage point, comprising:

an internally illuminable, non-transparent, translucent display object, said display object comprising material for diffusing light with an angle of divergence of at least ±15°;

a source for producing light in said display object to internally illuminate said display object and cause said display object to predominantly radiate internal light; and one or more lenses for projecting a virtual image of said display object.

4. An optical device according to claim 3 wherein said display object comprises material for diffusing light with an angle of divergence of at least ±30°.

5. An optical device according to claim 1 wherein said display object comprises material for diffusing light with an angle of divergence of at least +15° and a haze parameter of at least 50%.

6. An optical device according to claim 1 comprising:

a box containing said display object and having a front window supporting said one or more lenses.

7. An optical device according to claim 1 wherein said display object is hollow.

8. An optical device for producing a virtual image visible from a vantage point, comprising:

an internally illuminable, non-transparent, hollow display object;

a source for producing light in said display object to internally illuminate said display object and cause said display object to predominantly radiate internal light, said source being a light source mounted inside said display object; and one or more lenses for projecting a virtual image of said display object.

9. An optical device according to claim 2 wherein said display object is arranged to produce mostly diffuse light, said source being arranged to deliver substantially all its light internally to said display object.

10. An optical device according to claim 1 wherein said one or more lenses comprise one or more Fresnel lenses.

11. An optical device according to claim 1 wherein said source comprises a chamber containing a light source, said chamber having an open end optically coupled to said display object in order to internally illuminate it.

12. An optical device according to claim 11 wherein said display object has a light opening for receiving the open end of said chamber.

13. An optical device according to claim 12 wherein said display object has a hollow region, said light opening communicating with the hollow region of said display object.

14. An optical device for producing a virtual image visible from a vantage point, comprising:

an internally illuminable, non-transparent, hollow display object;

a source for producing light in said display object to internally illuminate said display object and cause said display object to predominantly radiate internal light, said source comprising a high voltage electrode in a transparent globe, said display object comprising a glowing gas stimulated by an electrical discharge from said high voltage electrode; and one or more lenses for projecting a virtual image of said display object.

15. An optical device according to claim 1 wherein said display object comprises a wavering incandescent filament, said source comprising an electrical line for delivering current to said filament.

16. An optical device according to claim 1 comprising:

a box containing said display object and having a front window supporting said one or more lenses; and a mirror behind said one or more lenses for providing thereto a reflected image of said display object.

17. An optical device according to claim 1 wherein said display object comprises:

a plurality of interchangeable objects, each being individually positionable to exclusively project the virtual image.

18. An optical device having multiple image projecting devices for combining multiple images into for producing a composite image visible from a vantage point, comprising:

a plurality of internally illuminated, matching display objects for predominantly radiating internal light; and a plurality of lenses each associated with a corresponding one of said plurality of display objects for projecting a plurality of virtual images each corresponding to one of said display objects, the plurality of virtual images of said lenses being coincident in order to increase the viewable angles of the composite image produced by the matching display objects.

19. An optical device according to claim 18 wherein said lenses have principal axes converging at a common point.

20. An optical device according to claim 18 wherein said lenses are greater than two in number and have equiangularly spaced principal axes converging at a common point.

21. An optical device according to claim 20 wherein at least three of said lenses have principal axes that are not coplanar.

22. An optical device according to claim 1 wherein said one or more lenses are at least two in number.

* * * * *